Feb. 25, 1969

O. W. SANDIDGE 3,429,301

ROTARY ENGINE

Filed April 28, 1967

Sheet _1_ of 3

OTHEL W. SANDIDGE
INVENTOR.

BY *Herbert J. Brown*

ATTORNEY

Feb. 25, 1969  O. W. SANDIDGE  3,429,301
ROTARY ENGINE

Filed April 28, 1967  Sheet 2 of 3

OTHEL W. SANDIDGE
INVENTOR.

BY *Herbert J. Brown*

ATTORNEY

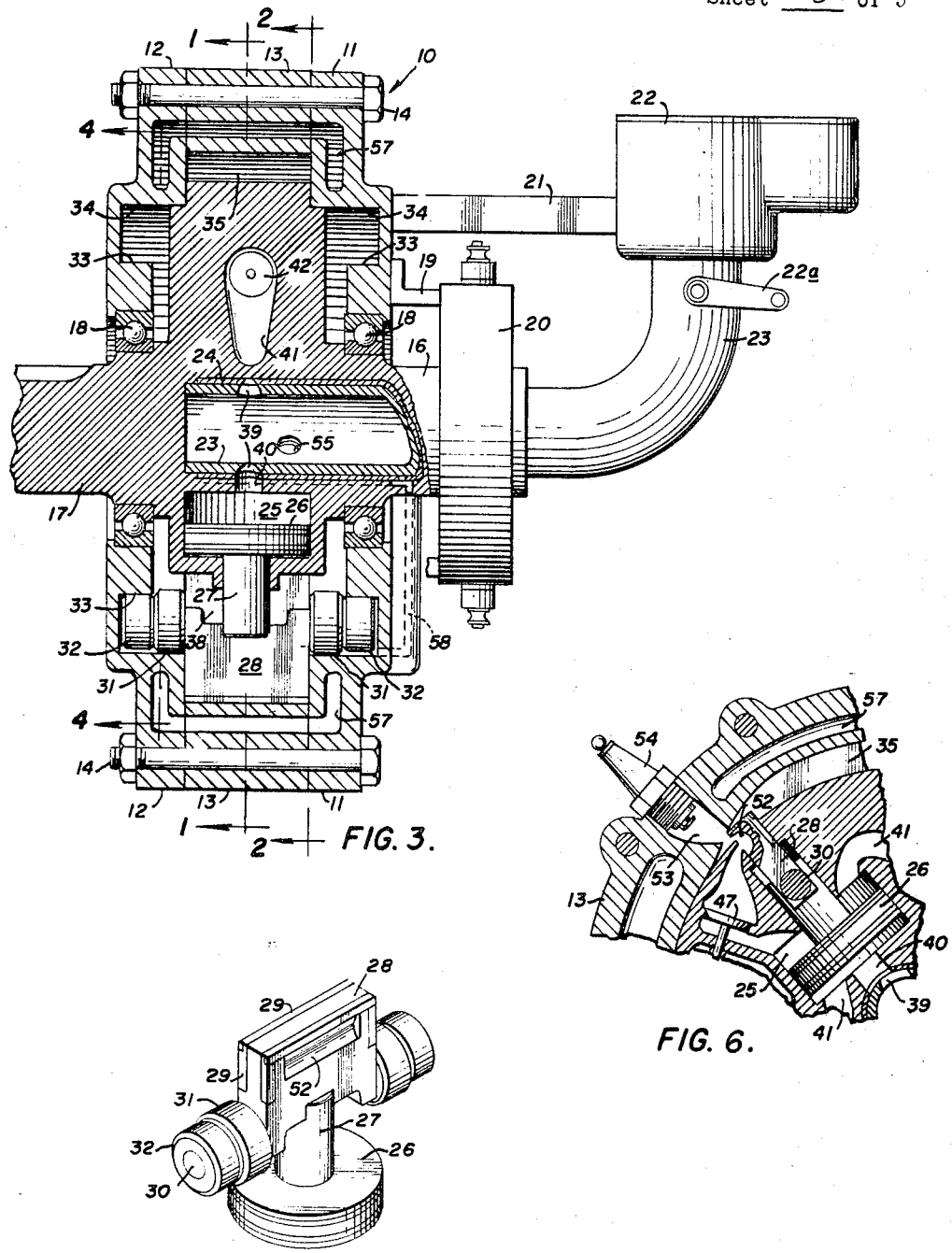

United States Patent Office 3,429,301
Patented Feb. 25, 1969

3,429,301
ROTARY ENGINE
Othel W. Sandidge, 2100 Eden Ave.,
Fort Worth, Tex. 76117
Filed Apr. 28, 1967, Ser. No. 634,609
U.S. Cl. 123—16
Int. Cl. F02b 53/08, 53/06
5 Claims

ABSTRACT OF THE DISCLOSURE

A rotary internal combustion engine of the vane type having a substantially circular rotating rotor coaxially mounted in a stationary arcuate-shaped casing and having supercharging pistons mounted for reciprocation in a radial direction coincident with the vanes. The fuel intake is provided through a hollow shaft which is connected to both sides of the piston; the arrangement being such that reciprocation of the pistons draws in the fuel charge, compresses it and directs it to the outer periphery of the rotor for the power stroke.

---

This invention relates to rotary internal combustion engines and has reference to that type of rotary engine wherein extensible vanes, carried by a rotor, move in arcuate grooves in a casing.

An object of the invention is to provide a more efficient rotary engine, that is, one which is smooth in its operation and has a high horsepower per unit weight ratio.

Another object is to provide a rotary engine combining advantages of both two cycle and four cycle engines, that is, there is no exhaust stroke as such, yet provides complete scavenging of the burned fuel.

A particular object is to provide double acting pistons in the rotor of a rotary engine together with a valve arrangement supplying highly compressed vaporized fuel to the firing chambers.

A further object is to provide means returning lubricating oil to the center bearings by the centrifugal action of the rotor, thus eliminating the need for an oil pump.

A further object is to provide an arrangement of poppet valves which are not affected by the centrifugal action of the rotor in which they are carried.

A still further object is to provide a rotary internal combustion engine wherein ignition takes place while the fuel is still being compressed as in reciprocating engines for increasing efficiency.

Another object is to provide a rotary internal combustion engine capable of supercharging the firing chamber.

These and other objects of the invention will become apparent from the following description and the accompanying drawings, in which:

FIGURE 3 is an elevational and sectional view taken on line 3—3 of FIGURE 1.

FIGURE 5 is a perspective view of one of the piston, vane and roller assemblies.

FIGURE 6 is a broken transverse sectional view similar to FIGURE 1, but showing the positions of a vane, compression chamber and firing chamber when in firing position.

Figure 1:
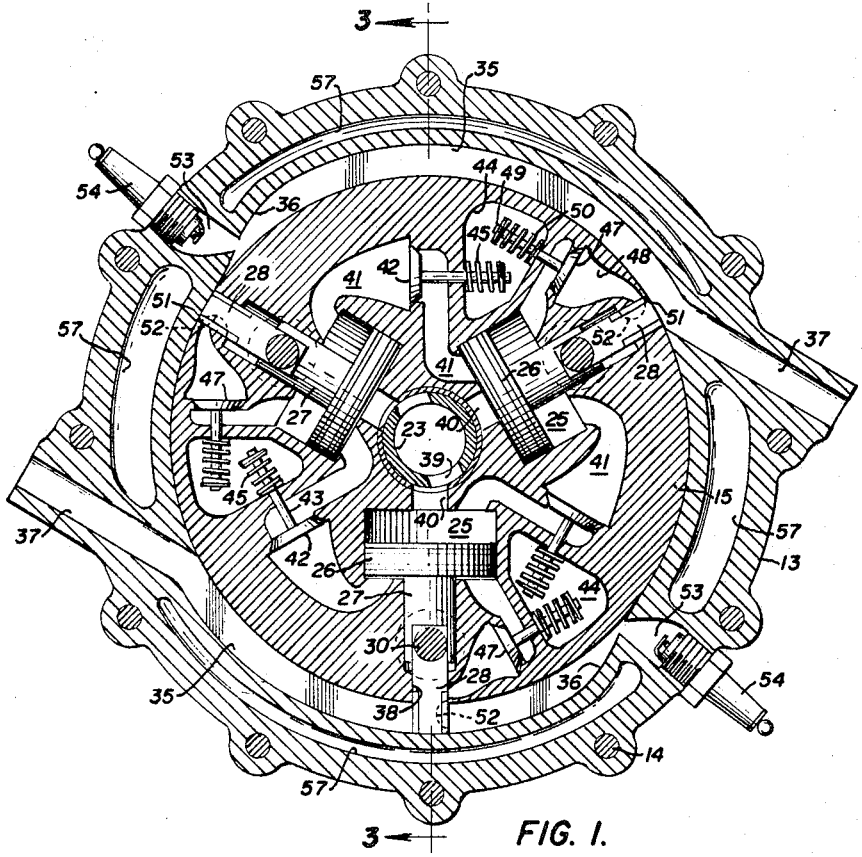
FIGURE 1 is a transverse sectional view of a rotary internal combustion engine according to the invention and is taken on line 1—1 of FIGURE 3.

The form of the invention shown includes a casing 10 comprised of front and rear end plates 11 and 12 and a circular body 13 therebetween, all of which are secured to each other by bolts 14. Within the casing 10 there is a rotor 15 having a stub shaft 16 extending through the front end plate 11 and a drive shaft 17 extending through the rear end plate 12. The shafts 16 and 17 are supported in roller bearings 18 mounted in their respective end plates 11 and 12. Mounted on the front end plate 11 by brackets 19 there is a magneto 20 and timer which merely indicate ignition means for firing spark plugs, hereinafter referred to. Forwardly of the casing 10 and mounted on a bracket 21 there is a carburetor 22 having a fuel intake manifold 23 which extends into a sleeve bushing 24 in the axial center of the rotor 15. A throttle lever 22a is shown on the manifold 23 near the carburetor 22.

Figure 4:
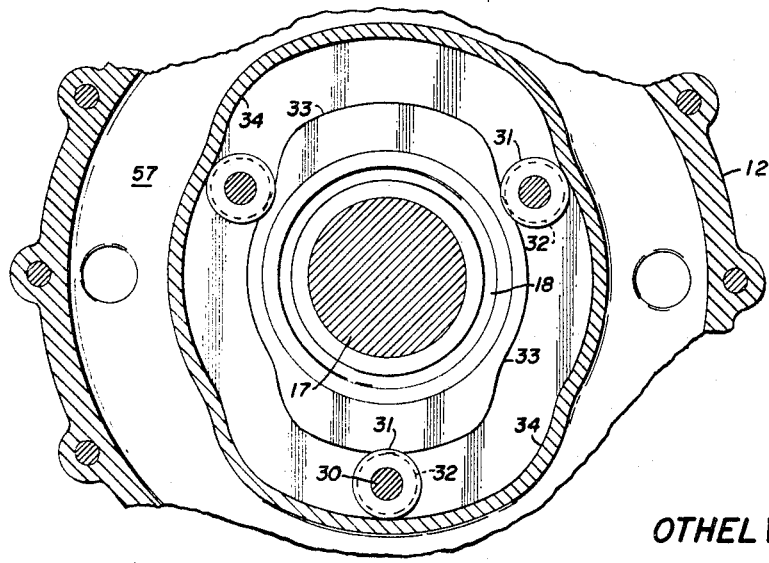
FIGURE 4 is a broken sectional view taken approximately on line 4—4 of FIGURE 3.
Figure 2:
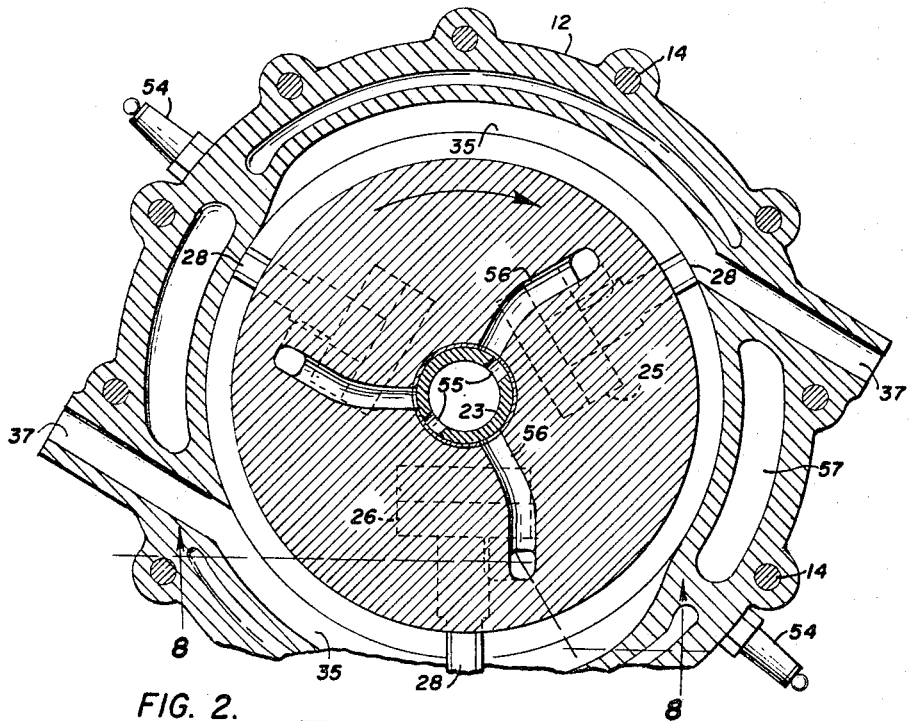
FIGURE 2 is also a transverse sectional view and is taken on line 2—2 of FIGURE 3.
Figure 8:
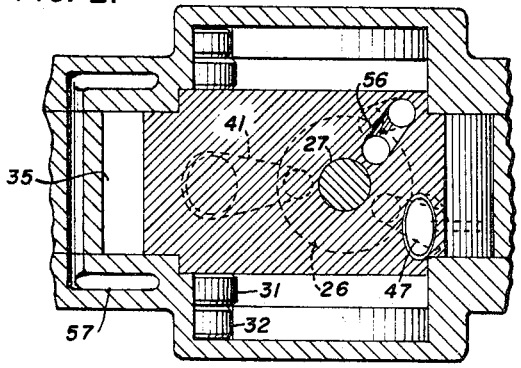
FIGURE 8 is a broken sectional view taken on lines 8—8 of FIGURE 2.
Figure 7:
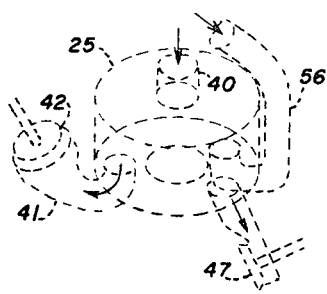
FIGURE 7 is a phantom perspective view of one of the piston cylinders and showing its connected passages.

Within the rotor 15 there are three equally spaced radially disposed cylinders 25 having relatively flat pistons 26 therein. Each piston 26 has a radially extending rod 27 and on the end of each rod there is a rectangular vane 28. The extending corner edges of the vanes 28 have inserts 29 of soft metal which serve as seals. On the sides and near the inner corners of the vanes 28 there are laterally projecting shafts 30 on which there are inner and outer cam rollers 31 and 32. As best shown in FIGURES 3 and 4, the rollers 31 and 32 engage inner and outer cams 33 and 34 in the inner faces of the end plates 11 and 12. The rises of the cams 33 and 34 are shaped to extend and retract the vanes 28 in two opposing arcuate chambers 35 in the inner periphery of the circular body 13. The ends of the arcuate chambers 35 in which the vanes 28 first operate are curved inwardly, at 36, to the circumference of the rotor 15, whereas the remaining ends of the chambers extend outwardly to provide exhaust ports 37. The vanes 28, which slide in transverse slots 38 in the rotor 15, are in close proximity with the surfaces of the chambers 35 at all times by reason of the shapes of the cams 33 and 34.

Near the inner end of the stationary intake manifold 23, and in line with a plane defined by the centers of the pistons 26, there are two opposing ports 39 which register with radial ports 40 in the inner ends of the cylinders 25. The diameters and locations of the ports 39 and 40 are such that they are open and partly open during the outward stroke of any one piston 26 whereby fuel is drawn into that piston's cylinder 25. At the inner end of each cylinder 25 there is a transfer passageway 41 to the bottom of the next cylinder in order of firing, and within each passageway there is a poppet valve 42 (check valve) arranged to permit flow in the direction referred to. The stems 43 of the poppet valves 42 are perpendicular to the radial lines of centrifugal force when the rotor 15 is turning, otherwise the operation of the valves would be impaired. The extending ends of the valve stems 43 are received in cavities 44 in the rotor 15 where they are provided with compression springs 45 in the usual manner. At the outer end of each cylinder 25 there is another passageway 46, a poppet valve 47 and a compression chamber 48. The poppet valves 47, like those first described, have their stems 49 extending into the cavities 44 and have springs 50 as before. The discharge end 51 of each compression chamber 48 extends transversely of the rotor 15 and opens in one side of each vane guide slot 38. When the vanes 28 are retracted the discharge ends 51 are closed and are open only when the blades are partly extended, as when entering the curved portion of an arcuate chamber 35. This is by reason of transverse semicylindrical bypasses 52 in the faces of the vanes 28 near the ends thereof and the widths of which bypasses are substantially twice the widths of the compression chamber discharge ends 51. The bypass action is best shown in FIGURE 6 where the compression chamber 48 is in communication with a firing chamber 53 in the casing body 13, which firing chamber opens into the curved end 36 of the arcuate chamber 35. Each firing chamber 53 is provided with a spark plug 54. Within that portion of the manifold 23 about which the rotor 15 turns, and offset from the first described ports 39, there are opposing ports 55 which communicate with elongate ports 56 to the lower ends of the cylinders, and which ports are open during the inward strokes of the pistons 26. Thus, the pistons 26 are double acting and fuel delivered to the bottoms of the cylinders 25 is compressed and forced into the compression chambers 48 during the outward strokes of the pistons 26.

Other details shown in the drawings include a water jacket 57 in the manner of internal combustion engines and a lubrication passageway 58 extending from the outer cam 34, through the front end plate (which does not rotate) to the sleeve bearing 24. By reason of the rotation of the rollers 31, 32 and the vanes 28, lubricating fluid at these locations is forced through the passageway 58.

In operation, the rotor is initially caused to turn by a starter or the like, not shown. The action of the pistons 26 draws fuel in through the ports 39 and 55, after which it is compressed in the manner described in the foregoing. When the rotor 15 reaches the position shown in FIGURE 6 ignition takes place. Expansion of the ignited fuel forces each vane 28, in turn, along a channel 35, thereby imparting power to the drive shaft 17. At the same time burned fuel in the channels 35 ahead of the vanes 28 is scavenged by the latter.

The invention is not limited to the exemplary construction herein shown and described, but may be made in various ways within the scope of the appended claims.

What is claimed is:

1. In a rotary internal combustion engine including a casing and circular rotor therein and arcuate chambers in said casing wherein the circumference of said rotor defines the inner walls of said arcuate chambers, and including cam operated vanes slidably mounted in radial slots in the periphery of said rotor, the combination of radial cylinders in said rotor inwardly of and in alignment with said vanes, pistons in said cylinders connected with said vanes at the inner ends thereof, fuel intake means in the axial center of said rotor, first ports connecting said fuel intake means with the inner ends of said cylinders and second ports connecting said fuel intake means with the outer ends of said cylinders, first and second valves in said first and second ports, a transfer passageway connecting the top of each said cylinder to the bottom of the next said cylinder in order of firing, a check valve in each said transfer passageway, compression chambers in said rotor adjacent the periphery thereof, a second passageway connecting the top of each said cylinder with a said compression chamber, a check valve in each said second passageway, a discharge end in each said compression chamber opening in a said vane receiving slot, means carried by said vanes opening and closing said discharge ends in said compression chambers, and wherein the longitudinal axis of each said check valve is at approximately ninety degrees with reference to the radial line of said rotor passing therethrough.

2. In a rotary internal combustion engine as defined in claim 1, the construction wherein the longitudinal axis of each said check valve is at ninety degrees with reference to the radial line of said rotor passing therethrough.

3. In a rotary internal combustion engine as defined in claim 1, the construction wherein said means opening and closing said discharge ends in said compression chambers is comprised of bypass slots in said vanes adjacent the ends thereof.

4. In a rotary internal combustion chamber defined in claim 1, the construction wherein said casing includes front and rear plates on opposite sides of said rotor, cams on the inner surfaces of said front and rear plates around the center thereof, and wherein said cam operated vanes have rollers on the sides thereof in rolling contact with said cams.

5. In a rotary internal combustion engine as defined in claim 1, the construction wherein the leading ends of said arcuate chambers are curved inwardly toward said rotor and include ignition means therein, and wherein the remaining ends of said arcuate chambers extend outwardly to provide exhaust ports.

References Cited
UNITED STATES PATENTS

| | | | |
|---|---|---|---|
| 921,802 | 5/1909 | Conkey | 123—16 |
| 1,722,057 | 7/1929 | McConkey et al. | 123—16 |
| 2,263,274 | 11/1941 | Pieper | 123—16 |

ROBERT A. O'LEARY, *Primary Examiner.*

WILLIAM E. WAYNER, *Assistant Examiner.*

U.S. Cl. X.R.

91—131; 123—8; 230—152